United States Patent
Chen (10) Patent No.: US 9,438,302 B2
(45) Date of Patent: Sep. 6, 2016

(54) RADIO FREQUENCY SWITCHING MODULE AND CONTROL METHOD THEREOF

(71) Applicant: RichWave Technology Corp., Taipei (TW)

(72) Inventor: Chih-Sheng Chen, Taipei (TW)

(73) Assignee: RichWave Technology Corp., Taipei (TW)

( * ) Notice: Subject to any disclaimer, the term of this patent is extended or adjusted under 35 U.S.C. 154(b) by 0 days.

(21) Appl. No.: 14/636,189

(22) Filed: Mar. 3, 2015

(65) Prior Publication Data
US 2015/0303978 A1 Oct. 22, 2015

(30) Foreign Application Priority Data
Apr. 21, 2014 (TW) .............................. 103114415 A (51) Int. Cl.
*H04B 1/44* (2006.01)
*H04W 52/02* (2009.01)
*H04B 1/525* (2015.01)

(52) U.S. Cl.
CPC ........... *H04B 1/44* (2013.01); *H04W 52/0274* (2013.01); *H04B 1/525* (2013.01)

(58) Field of Classification Search
CPC .... H04B 1/44; H04B 1/401; H04W 52/0274
USPC ......................................................... 455/78
See application file for complete search history.

(56) References Cited

U.S. PATENT DOCUMENTS

| 8,380,139 | B2* | 2/2013 | Feng | ......................... | H01P 1/10 455/78 |
|---|---|---|---|---|---|
| 8,493,128 | B2* | 7/2013 | Adamski | .............. | H03K 17/693 327/365 |
| 8,497,727 | B2* | 7/2013 | Chiu | ..................... | H03K 17/693 327/365 |
| 8,964,532 | B2* | 2/2015 | Capece | ................ | H04B 1/0483 370/219 |
| 2004/0214528 | A1* | 10/2004 | Khorram | ................... | H04B 1/44 455/78 |
| 2009/0003196 | A1* | 1/2009 | Capece | ................ | H04B 1/0483 370/220 |
| 2012/0129468 | A1* | 5/2012 | Maimon | .............. | H04B 1/0458 455/73 |
| 2012/0139616 | A1* | 6/2012 | Chiu | ..................... | H03K 17/693 327/436 |
| 2012/0274387 | A1* | 11/2012 | Adamski | .............. | H03K 17/693 327/437 |
| 2014/0011463 | A1* | 1/2014 | Madan | ..................... | H04B 1/44 455/78 |
| 2014/0062218 | A1 | 3/2014 | Chih-Sheng | | |

FOREIGN PATENT DOCUMENTS

TW            201409939 A      3/2014

\* cited by examiner

*Primary Examiner* — April G Gonzales
(74) *Attorney, Agent, or Firm* — Winston Hsu; Scott Margo (57) ABSTRACT

A radio frequency (RF) switching module and a control method of the RF switching module are described. The RF switching module has 2 switches, and the control method includes starting to turn off a first switch of the RF switching module, starting to turn on a second switch of the RF switching module after the first switch is turned off for a first predetermined time, wherein starting to turn off the first switch and starting to turn on the second switch is finished during a transition period from a first mode to a second mode.

18 Claims, 9 Drawing Sheets

RADIO FREQUENCY SWITCHING MODULE AND CONTROL METHOD THEREOF

CROSS-REFERENCE TO RELATED APPLICATION

The present application is based on, and claims priority from, Taiwan Application Serial Number 103114415, filed on Apr. 21, 2014, the disclosure of which is hereby incorporated by reference herein in its entirety.

BACKGROUND OF THE INVENTION

1. Field of the Invention

The embodiment relates to a radio frequency (RF) switching module and a control method thereof, and particularly to an RF switching module and a control method that can decrease RF signal leakage.

2. Description of the Prior Art

With popularity of wireless communication, setting RF circuits in various devices has become a trend, wherein an RF switching module is one of the RF circuits.

When the RF switching module transmits RF signals, a switch located at a transmitting port of the RF switching module is turned on to transmit the RF signals through an antenna, and a switch located at a receiving port of the RF switching module is turned off to prevent the RF signals of the transmitting port from leaking to the receiving port. RF signal leakage not only decreases quality of the RF signals when the RF switching module transmits/receives the RF signals, but also damages low voltage devices of the receiving port. In addition, the RF signal leakage also increases additional power consumption to further decrease usage time of a battery applied to a mobile device. Therefore, an effective and adjustable control method for decreasing the RF signal leakage of the RF switching module is necessary.

SUMMARY OF THE INVENTION

An embodiment provides a control method of an RF switching module, wherein the RF switching module includes a first switch coupled between a common port and a first port, and a second switch coupled between the common port and a second port, wherein the RF switching module is applied to switch between a first mode and a second mode, the first switch is turned on and the second switch is turned off in the first mode, and the first switch is turned off and the second switch is turned on in the second mode. The control method includes providing a first turning-off signal to the first switch when the RF switching module is in the first mode; providing a first turning-on signal to the second switch after the first turning-off signal is provided for a first predetermined time; and switching the RF switching module from the first mode to the second mode according to the first turning-on signal.

Another embodiment provides an RF switching module. The RF switching module includes a first switch, a second switch, and a control signal generation module for providing a first turning-off signal and a first turning-on signal. The first switch is coupled between a common port and a first port. The second switch is coupled between the common port and a second port. The control signal generation module is used for providing a first turning-off signal and a first turning-on signal. The RF switching module is applied to switch between a first mode and a second mode, the first switch is turned on and the second switch is turned off in the first mode, and the first switch is turned off and the second switch is turned on in the second mode. The first turning-off signal is provided to the first switch when the RF switching module is in the first mode, and the first turning-on signal is provided to the second switch after the first turning-off signal is provided for a first predetermined time to make the RF switching module be switched from the first mode to the second mode.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
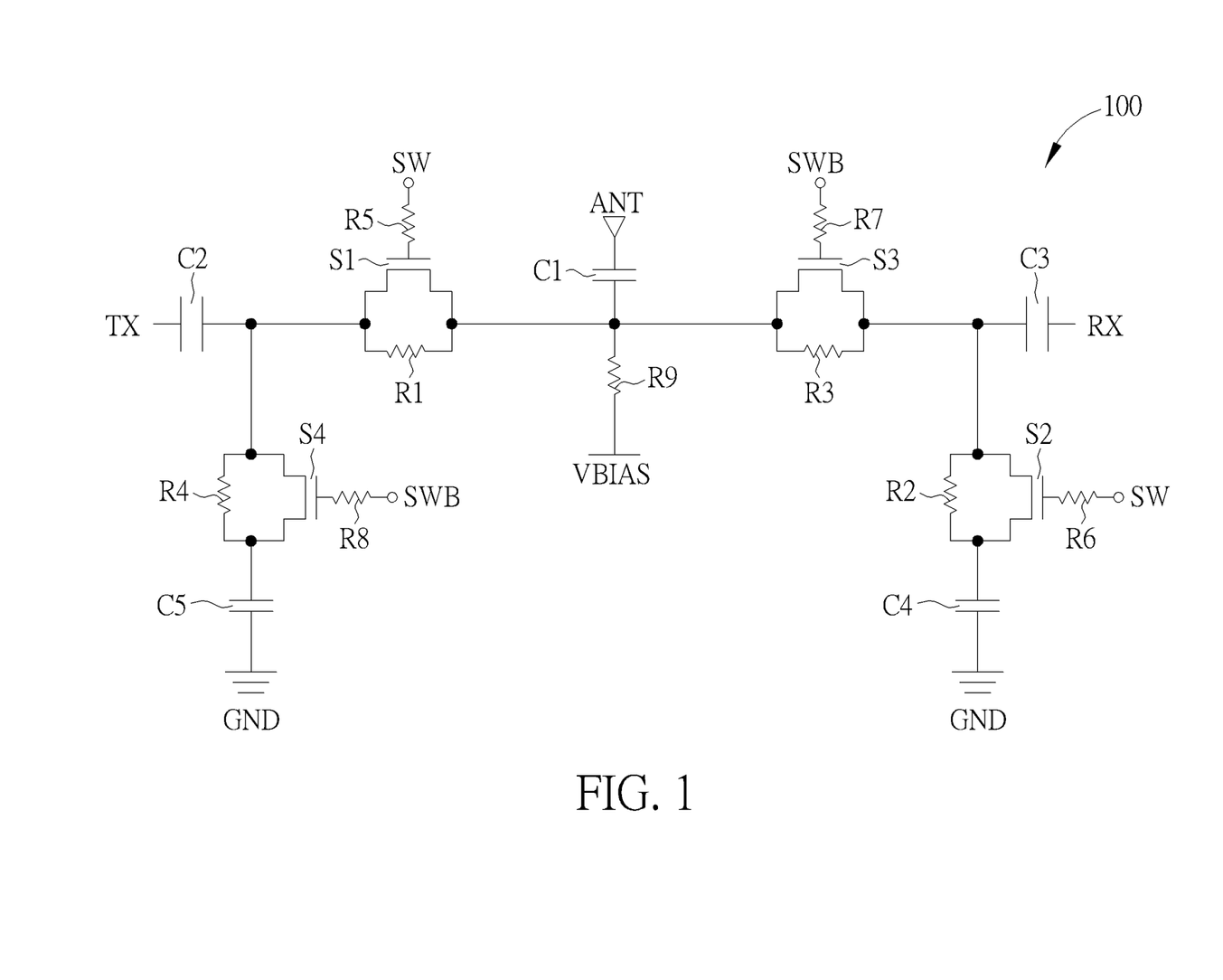
FIG. 1 is a diagram illustrating an RF switching module 100 according to an embodiment.

Please refer to FIG. 1. FIG. 1 is a diagram illustrating an RF switching module 100 according to an embodiment. The RF switching module 100 includes switches S1~S4, resistors R1~R9, and capacitors C1~C5, wherein each of the switches S1~S4 has a first terminal, a second terminal, and a control terminal. In the embodiment of FIG. 1, the switches S1~S4 are metal-oxide-semiconductor field effect transistors (MOSFET). A control terminal and a first terminal/second terminal of each of the switches S1~S4 can be a gate and a source/drain of a MOSFET, respectively.

The resistors R1~R4 are coupled to first terminals and second terminals of the switches S1~S4 respectively for making direct current (DC) biases at the first terminals of the switches S1~S4 be equal to DC biases at the second terminals of the switches S1~S4. Resistors R5~R8 are coupled to control terminals of the switches S1~S4, respectively. Resistor R9 is coupled between a bias VBIAS and the capacitor C1 to set DC biases of terminals of the switches S1, S3 adjacent to the resistor R9. The resistors R1~R9 are designed to have high impedance, and the resistors R5~R9 are used for preventing RF signals from leaking to terminals corresponding to control signals SW, SWB, and the bias VBIAS through switch channels (that is, the switches S1~S4) to prevent from signal loss or signal distortion.

When the RF switching module 100 is in a first mode (e.g. a transmitting mode), the control signal SW is high to make the switch S1 turning-on, resulting in the RF signals being transmitted from a port TX (a first port) to a port ANT (a common port) to emit through the switch S1, and also make the switch S2 turning-on to let signals of a port RX (a second port) bypass to ground GND to prevent from interfering with the RF signals transmitted to the port ANT. Meanwhile, the control signal SWB is low to make the switch S3 turning-off to prevent the RF signals transmitted to the port ANT from entering the port RX, and also make the switch S4 turning-off to prevent the RF signals of the port TX from bypassing to the ground GND. Similarly, when the RF switching module 100 is in a second mode (e.g. a receiving mode), turning-on/turning-off states of the switches S1~S4 are just opposite to those of the switches S1~S4 in the transmitting mode, wherein RF signals are received by the port ANT and transmitted to the port RX through the switch S3.

Figure 2:
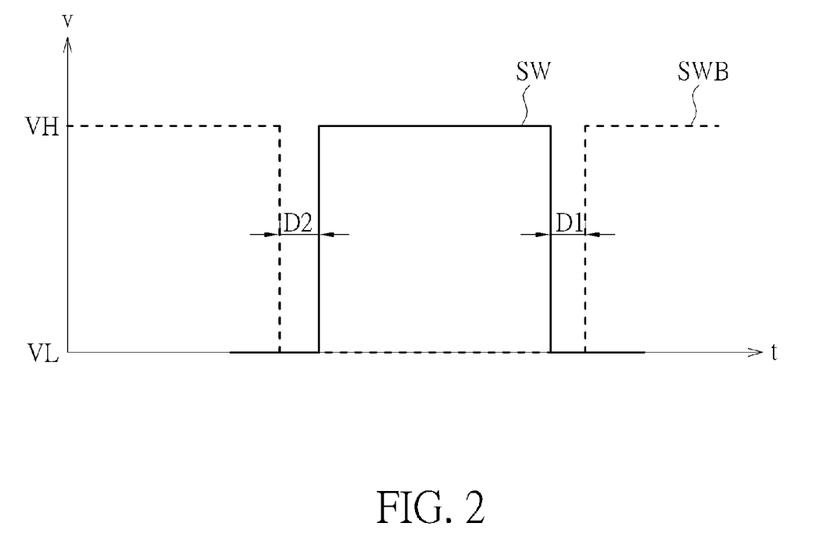
FIG. 2 is a timing diagram illustrating the control signals of the RF switching module.

FIG. 2 is a timing diagram illustrating the control signals SW, SWB of the RF switching module 100, wherein a solid line represents the control signal SW, a dashed line represents the control signal SWB, t represents a time axis, v represents a voltage axis, VH represents a high voltage, and VL represents a low voltage. The control signal SW is used for controlling turning-on and turning-off of the switches S1, S2, and the control signal SWB is used for controlling turning-on and turning-off of the switches S3, S4. When the control signals SW, SWB are switched, a high impedance gate resistor and an equivalent gate capacitor of each of the switches S1~S4 can cause a time delay (that is, an RC-delay) between a gate voltage and a control signal thereof.

In addition, when the RF switching module 100 is switched between the transmission mode and the receiving mode, the capacitors C1~C5 need to be charged or discharged, wherein the capacitors C1~C5 are charged or discharged after an sufficient charging/discharging time, source/drain biases of the switches S1~S4 just achieve a design value, resulting in the switches S1~S4 being completely turned on or turned off. Adding charging/discharging circuits at the sources/drains of the switches S1~S4 can accelerate turning-on or turning-off of the switches S1~S4, but need additional chip area and power consumption.

When the control signal SWB is switched from the high voltage (VH) to the low voltage (VL), the switch S3 is not immediately turned off because of a gate voltage time delay caused by the gate resistor and the equivalent gate capacitor of the switch S3, and the charging/discharging time for the source/drain bias of the switch S3 reaching the design value. Meanwhile, if the switch S1 is already turned on, the RF signals of the port TX can leak to the port RX through the switch S3. The RF signal leakage not only decreases quality of the RF signals of the port TX, but also interferes with signals of the port RX or damages low voltage devices of the port RX.

To prevent from the RF signal leakage of the port TX, the control signal SW can be designed to switch from low to high after the control signal SWB is switched from high to low for a predetermined time D2; and on the other hand, the control signal SWB is switched from low to high after the control signal SW is switched from high to low for a predetermined time D1. For example, after the RF switching module 100 completes the transmitting mode, the control signal SW is switched from high to low to early turn off the switches S1, S2 for the predetermined time D1, and then the control signal SWB is switched from low to high to turn on the switches S3, S4 to make the RF switching module 100 enter the receiving mode; and vice versa. Thus, the RF switching module 100 can prevent from simultaneously switching the control signals SW, SWB to cause the RF signal leakage. Optimal values of the predetermined times D1, D2 can be determined according to the gate voltage time delay, the charging/discharging time, and a requirement of a communication specification to prevent from the above mentioned RF signal leakage and the RF switching module 100 operates effectively in time domain.

Figure 3:
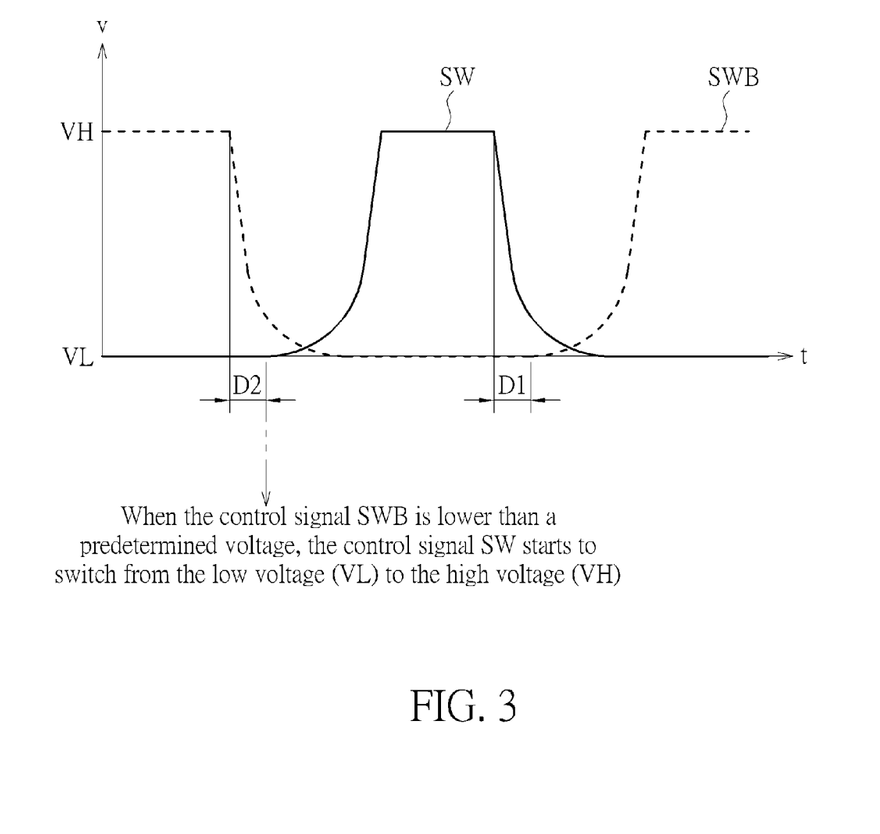
FIG. 3 is a timing diagram illustrating the control signals of the RF switching module according to another embodiment.

FIG. 3 is a timing diagram illustrating the control signals SW, SWB of the RF switching module 100 according to another embodiment, wherein a solid line represents the control signal SW, and a dashed line represents the control signal SWB. When the control signal SWB is switched from high to low, the control signal SWB has a switching delay time thereof because of parasitic effects of a system where the RF switching module 100 is applied to or an environment surrounding the RF switching module 100. In FIG. 3, the control signal SWB can be set to start to decrease from the high voltage (VH) for the predetermined time D2, then the control signal SW starts to increase from the low voltage (VL). That is to say, after the control signal SWB starts to decrease from the high voltage (VH) and is lower than a predetermined voltage, the control signal SW starts to increase from the low voltage (VL) to prevent the RF signals of the port TX from leaking to the port RX through the switch S3 to avoid the above mentioned RF signal leakage. Similarly, the control signal SW can be set to start to decrease from the high voltage (VH) for the predetermined time D1, then the control signal SWB starts to increase from the low voltage (VL). That is to say, after the control signal SW starts to decrease from the high voltage (VH) and is lower than a predetermined voltage, the control signal SWB starts to increase from the low voltage (VL) to prevent the RF signals of the port RX from leaking to the port TX through the switch S1 to avoid the above mentioned RF signal leakage. Further, in one embodiment of the present invention, the predetermined time D1 is greater than the predetermined time D2.

Figure 4:
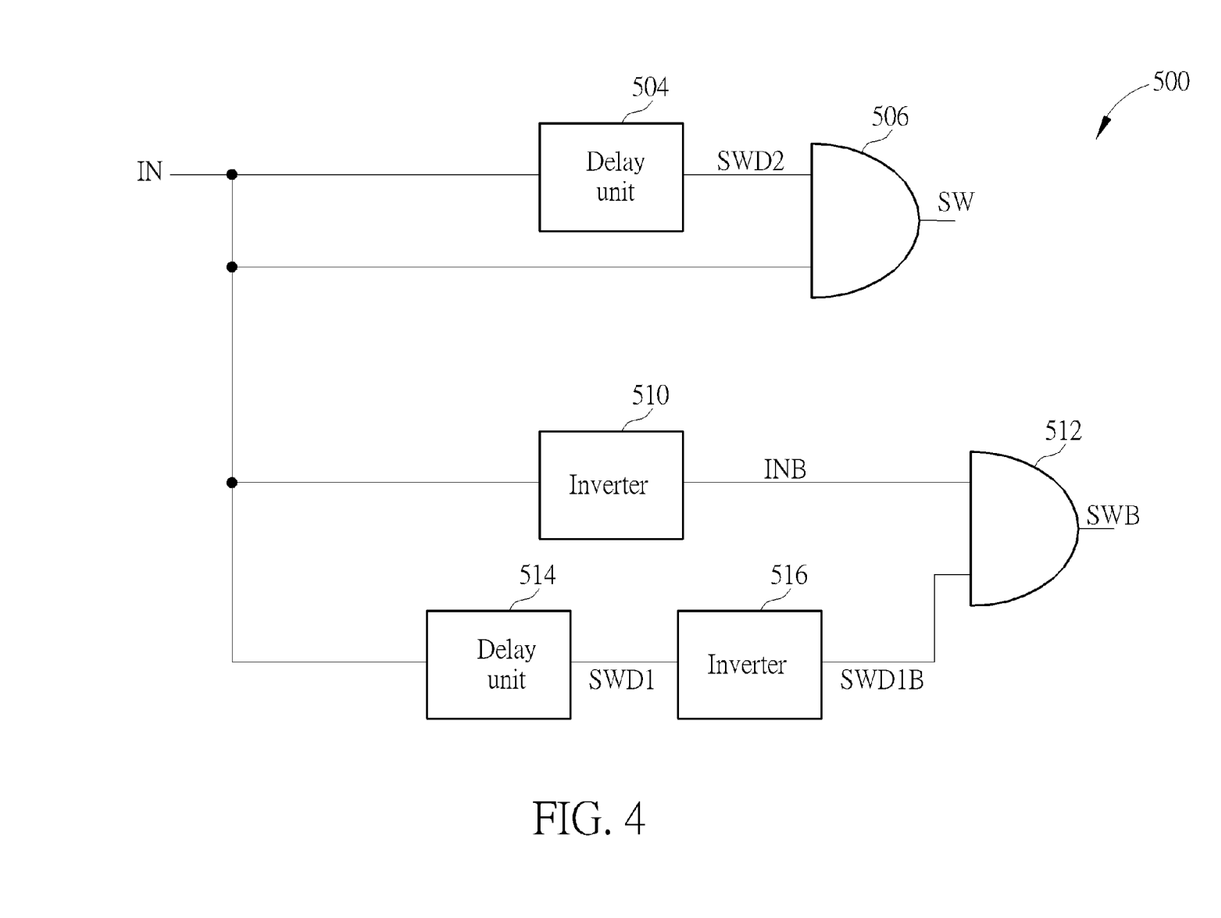
FIG. 4 is diagram illustrating a control signal generation module for generating the control signals shown in FIG. 2.
Figure 5:
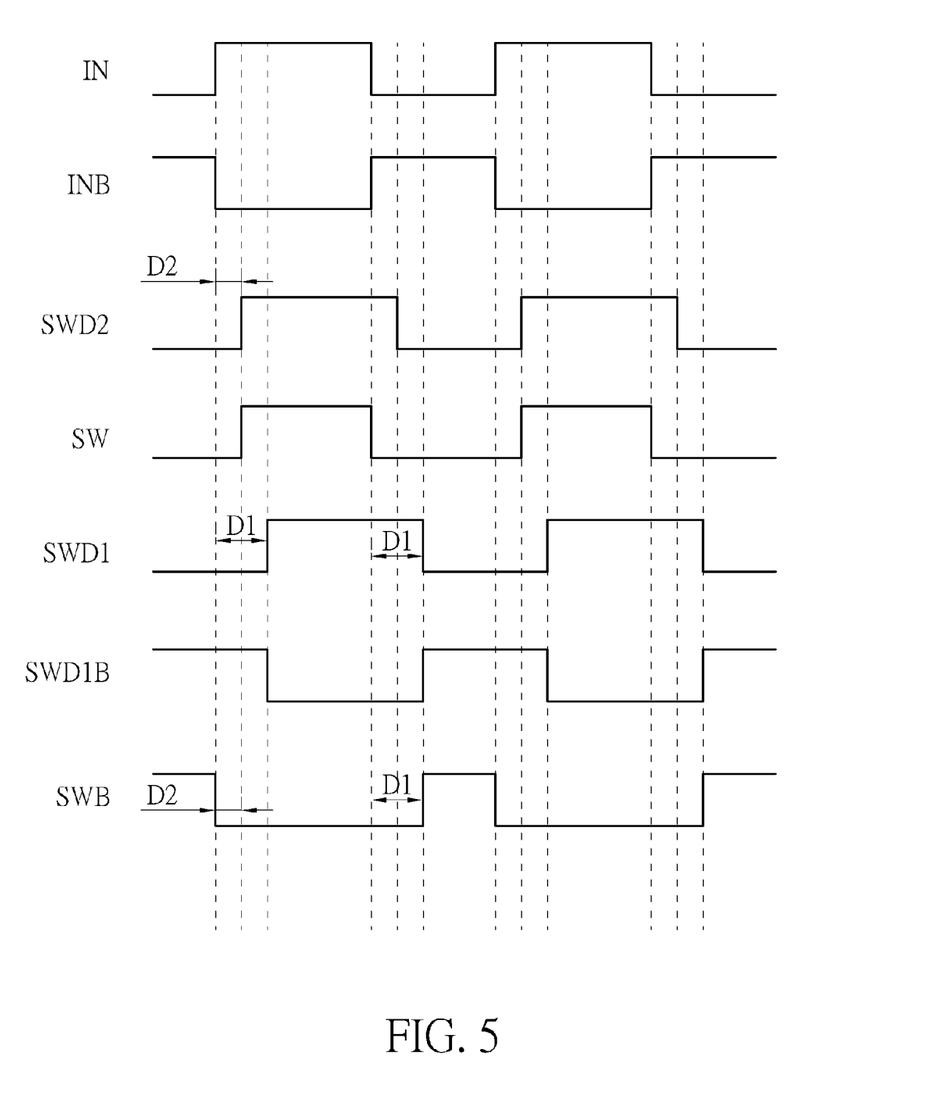
FIG. 5 is a timing diagram of the signals IN, INB, SWD2, SW, SWD1, SWD1B and SWB shown in FIG. 4.

FIG. 4 is a diagram illustrating a control signal generation module 500 for generating the control signals SW, SWB shown in FIG. 2. In the control signal generation module 500, an AND gate 506 is coupled to the switches S1, S2 (not shown in FIG. 4), and an AND gate 512 is coupled to the switches S3, S4 (not shown in FIG. 4). A delay unit 504 can generate and output a delay signal SWD2 to the AND gate 506 according to an input signal IN and the predetermined time D2; and then the AND gate 506 can generate and output the control signal SW to the switches S1, S2 according to the input signal IN and the delay signal SWD2. In addition, an inverter 510 can generate and output an inverse signal INB to the AND gate 512 according to the input signal IN; and a delay unit 514 can generate and output a delay signal SWD1 to an inverter 516 according to the input signal IN and the predetermined time D1, wherein an inverter 516 can generate and output an inverse delay signal SWD1B to the AND gate 512 according to the delay signal SWD1; and then the AND gate 512 can generate and output the control signal SWB to the switches S3, S4 according to the inverse delay signal SWD1B and the inverse signal INB. FIG. 5 is a timing diagram of the input signal IN, the inverse signal INB, the delay signal SWD2, the control signal SW, the delay signal SWD1, the inverse delay signal SWD1B, and the control signal SWB shown in FIG. 4 illustrating that the design of the control signal generation module 500 can generate the predetermined times D1, D2 shown in FIG. 2 when the control signals SW, SWB are switched.

Figure 6:
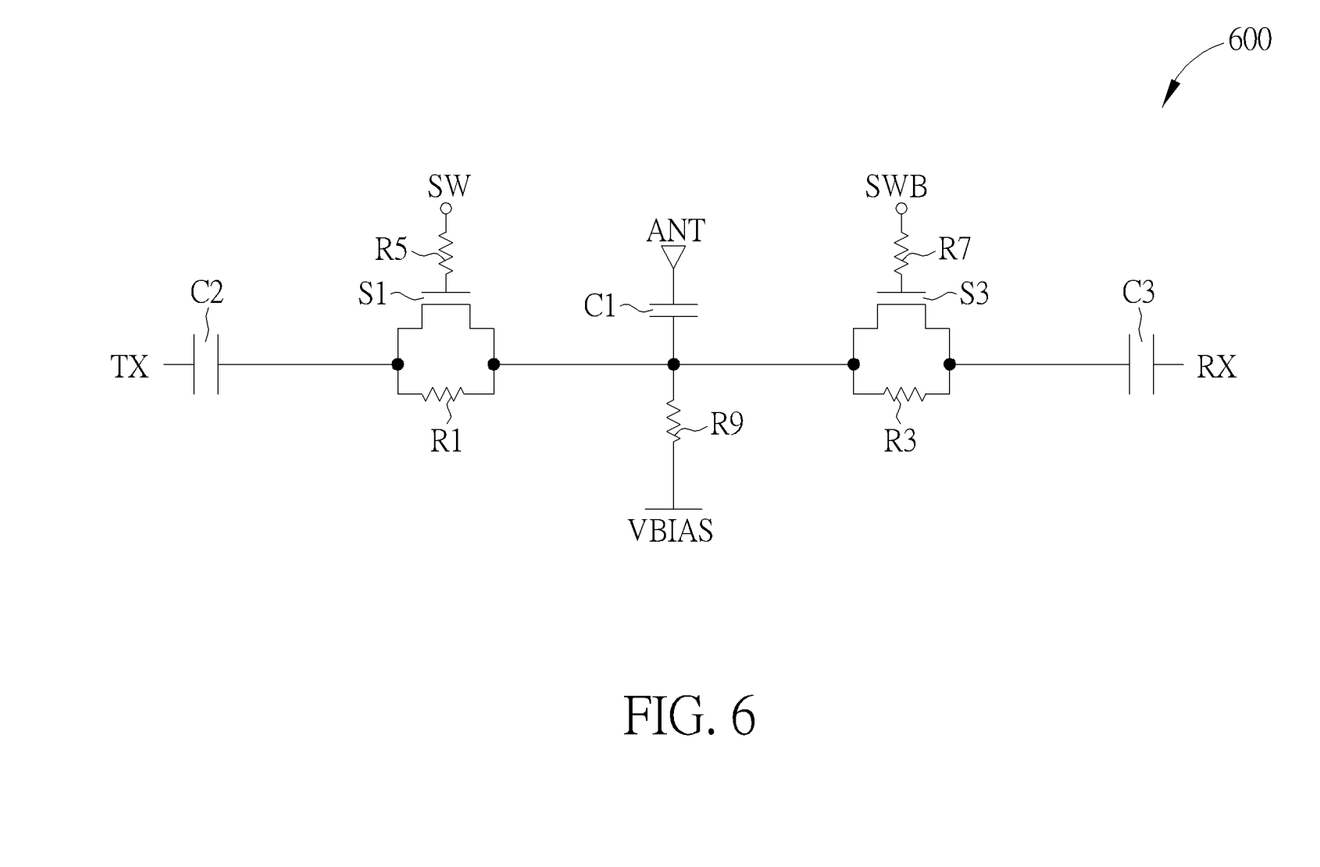
FIG. 6 is a diagram illustrating an RF switching module according to another embodiment.

In addition, please refer to FIG. 6. FIG. 6 is a diagram illustrating an RF switching module 600 according to another embodiment. As shown in FIG. 6, a difference between the RF switching module 100 and the RF switching module 600 is that the RF switching module 600 does not include the switch channels corresponding to the switches S2, S4. Further, subsequent operational principles of the RF switching module 600 are the same as those of the RF switching module 100, so further description thereof is omitted for simplicity.

Figure 7:
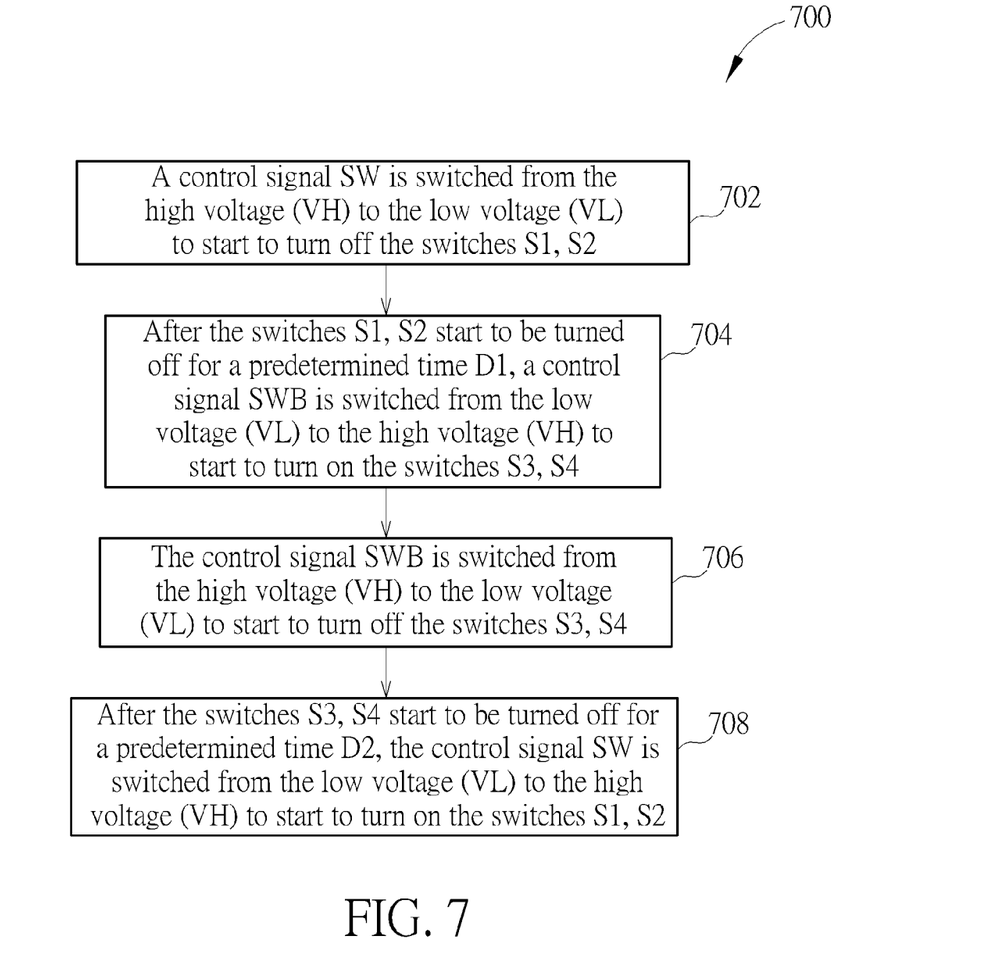
FIG. 7 is a flowchart illustrating a control method of the RF switching module according to another embodiment.

FIG. 7 is a flowchart illustrating a control method of the RF switching module 100 according to another embodiment. Detailed steps of the control method 700 are as follows:

Step 702: When the RF switching module 100 is in the first mode, a first turning-off signal is provided to the switches S1, S2. For example, a control signal SW is switched from a high voltage (VH) to a low voltage (VL), resulting in the switches S1, S2 starting to be turned off.

Step 704: After the first turning-off signal is provided to the switches S1, S2 for a predetermined time D1 (that is, the switches S1, S2 start to be turned off for the predetermined time D1), a first turning-on signal is provided to the switches S3, S4. For example, a control signal SWB is switched from the low voltage (VL) to the high voltage (VH), resulting in the switches S3, S4 starting to be turned on to switch the first mode to the second mode.

Step 706: A second turning-off signal is provided to the switches S3, S4. For example, the control signal SWB is switched from the high voltage (VH) to the low voltage (VL), resulting in the switches S3, S4 starting to be turned off.

Step 708: After the second turning-off signal is provided to the switches S3, S4 for a predetermined time D2 (that is, the switches S3, S4 start to be turned off for the predetermined time D2), a second turning-on signal is provided to the switches S1, S2. For example, the control signal SW is switched from the low voltage (VL) to the high voltage (VH), resulting in the switches S1, S2 starting to be turned on to switch the second mode to the first mode.

According to the above mentioned steps, the control signal SW includes the first turning-off signal and the second turning-on signal; and the control signal SWB includes the first turning-on signal and the second turning-off signal.

In Step 702, when the control signal SW is switched from the high voltage (VH) to the low voltage (VL), the switch S1 is not immediately turned off, wherein a time for decrease of the gate voltage of the switch S1 is determined by equation (1). In equation (1), t represents time, exp represents an exponential function, RR5 represents a resistance of the gate resistor R5, Cg5 represents a capacitance of an equivalent gate capacitor of the switch S1, and Vg(t) represents the gate voltage of the switch S1 at the time t.

$$Vg(t)=(VH-VL)*\exp(-t/(RR5*Cg5))+VL \quad (1)$$

Figure 8:
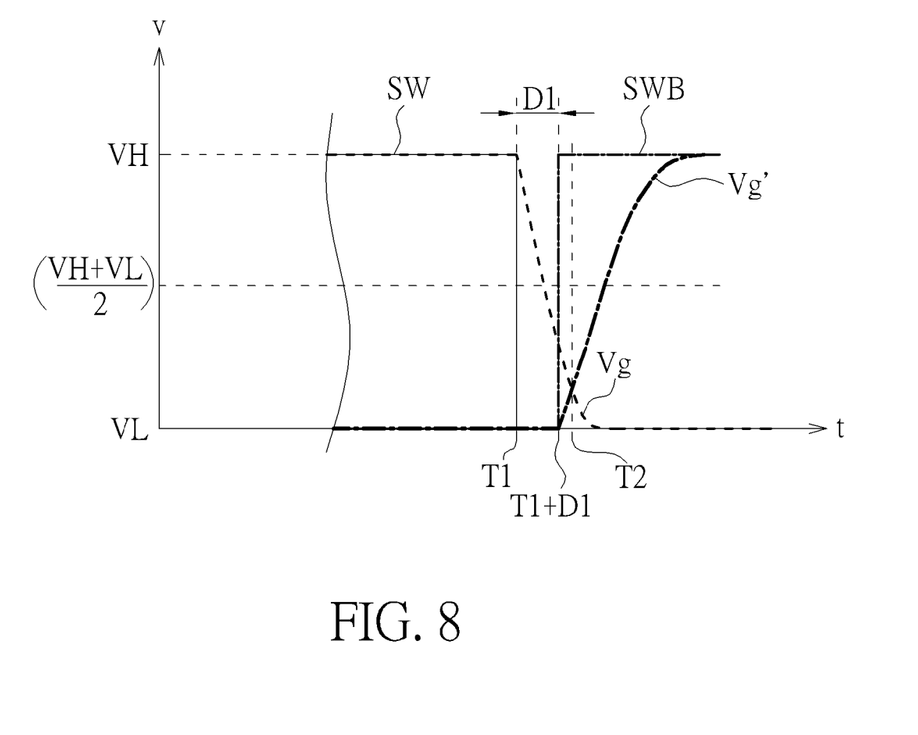
FIG. 8 is a timing diagram illustrating the gate voltages of the switches.

FIG. 8 is a timing diagram illustrating the gate voltages of the switches S1, S3. If the control signal SW starts to be switched from high to low at the time T1, change of the gate voltage of the switch S1 with time is shown as Vg. After the predetermined time D1 (that is, at the time T1+D1), the control signal SWB just starts to be switched from low to high. Meanwhile, change of the gate voltage of the switch S3 with time is shown as Vg'. At the time T2, the switch S1 is almost turned off and the gate voltage of the switch S3 is not increased to a high voltage which is not enough to turn on the switch S3 completely, so RF signal leakage from the port TX to the port RX through the switches S1, S3 can be decreased significantly, and power consumption of the RF switching module 100, low voltage device damage of the port RX, or unexpected results can also be decreased.

The time T1+D1 can be set after the switch S1 is completely turned off, or after the gate voltage Vg of the switch S1 is lower than the threshold voltage of the switch S1 or a voltage (VH+VL)/2. The time D1 can be set to be equal to or greater than a product of RR5*Cg5.

Similarly, the above mentioned principles can also be applied to Steps 706, 708 to utilize the predetermined time D2 to reduce the RF signal leakage from the port RX to the port TX, so further description thereof is omitted for simplicity.

Figure 9:
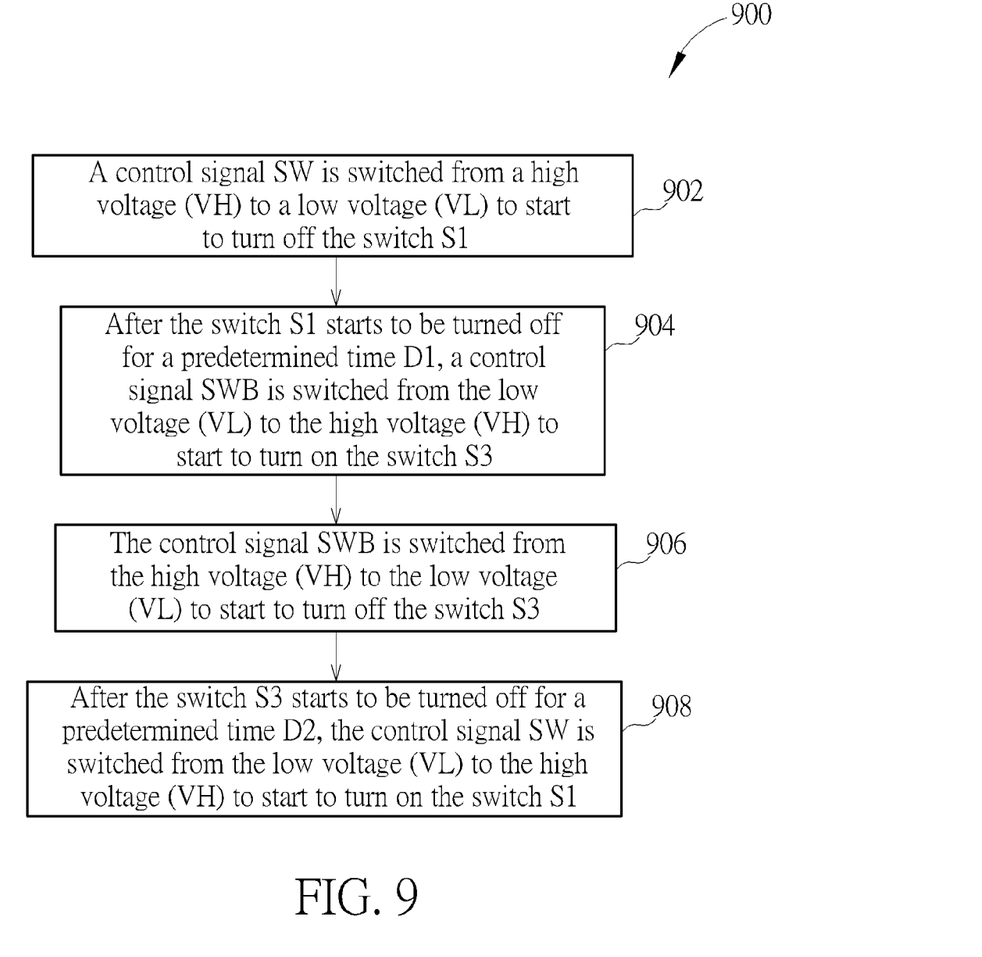
FIG. 9 is a flowchart illustrating a control method of the RF switching module according to another embodiment.

FIG. 9 is a flowchart illustrating a control method of the RF switching module 600 according to another embodiment. Detailed steps of the control method 900 are as follows:

Step 902: When the RF switching module 600 is in the first mode, a first turning-off signal is provided to the switch S1. For example, a control signal SW is switched from a high voltage (VH) to a low voltage (VL), resulting in the switch S1 starting to be turned off.

Step 904: After the first turning-off signal is provided to the switch S1 for a predetermined time D1 (that is, the switch S1 starts to be turned off for the predetermined time D1), a first turning-on signal is provided to the switch S3. For example, a control signal SWB is switched from the low voltage (VL) to the high voltage (VH), resulting in the switch S3 starting to be turned on to switch the first mode to the second mode.

Step 906: A second turning-off signal is provided to the switch S3. For example, the control signal SWB is switched from the high voltage (VH) to the low voltage (VL), resulting in the switch S3 starting to be turned off.

Step 908: After the second turning-off signal is provided to the switch S3 for a predetermined time D2 (that is, the switch S3 start to be turned off for the predetermined time D2), a second turning-on signal is provided to the switch S1. For example, the control signal SW is switched from the low voltage (VL) to the high voltage (VH), resulting in the switch S1 starting to be turned on to switch the second mode to the first mode.

Subsequent operational principles of the control method 900 are the same as those of the control method 700, so further description thereof is omitted for simplicity.

In one embodiment, the first turning-off signal, the first turning-on signal, the second turning-off signal, and the second turning-on signal control turning-on and turning-off of the switches S1~S4 by adjusting the biases of the gates of the switches S1~S4. In another embodiment, the first turning-off signal, the first turning-on signal, the second turning-off signal, and the second turning-on signal control turning-on and turning-off of the switches S1~S4 by adjusting voltage drops between the gates and the source/drains of the switches S1~S4.

To sum up, the RF switching module and the control method thereof turn off all switches during the RF switching module being switched between the transmitting mode and the receiving mode, and then turn on required switches after the all switches are turned off for a predetermined time to switch to a next mode (the transmitting mode or the receiving mode). Thus, the embodiment could significantly reduce RF signal leakage, RF signal interference each other, power consumption of the RF switching module, low voltage device damage of the receiving port, or unexpected results, and could also increase RF signal quality. In addition, the RF switching module provided by the embodiment can be implemented on a monolithic chip by a silicon on insulator (SOI) process, a high-electron-mobility transistor (HEMT) process, or a metal-oxide-semiconductor (MOS) process.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control method of a radio frequency (RF) switching module, the RF switching module comprising a first switch coupled between a common port and a first port, and a second switch coupled between the common port and a second port, wherein the RF switching module is applied to switching between a first mode and a second mode, the first switch is turned on and the second switch is turned off in the first mode, and the first switch is turned off and the second switch is turned on in the second mode, the method comprising:

providing a first turning-off signal to the first switch when the RF switching module is in the first mode;

providing a first turning-on signal to the second switch after the first turning-off signal is provided for a first predetermined time; and switching the RF switching module from the first mode to the second mode according to the first turning-on signal.

2. The control method of the claim 1, wherein the RF switching module further comprises a third switch coupled between the second port and ground and a fourth switch coupled between the first port and the ground, wherein the third switch is turned on and the fourth switch is turned off in the first mode, and the third switch is turned off and the fourth switch is turned on in the second mode, the control method further comprising:

providing the first turning-off signal to the third switch when the RF switching module is in the first mode; and providing the first turning-on signal to the fourth switch after the first turning-off signal is provided for the first predetermined time.

3. The control method of the claim 2, further comprising:

providing a second turning-off signal to the second switch and the fourth switch when the RF switching module is in the second mode;

providing a second turning-on signal to the first switch and the third switch after the second turning-off signal is provided for a second predetermined time; and switching the RF switching module from the second mode to the first mode according to the second turning-on signal.

4. The control method of the claim 1, further comprising:

providing a second turning-off signal to the second switch when the RF switching module is in the second mode;

providing a second turning-on signal to the first switch after the second turning-off signal is provided for a second predetermined time.

5. An RF switching module, comprising:

a first switch coupled between a common port and a first port;

a second switch coupled between the common port and a second port; and a control signal generation module for providing a first turning-off signal and a first turning-on signal;

wherein the RF switching module is applied to switching between a first mode and a second mode, the first switch is turned on and the second switch is turned off in the first mode, and the first switch is turned off and the second switch is turned on in the second mode;

wherein the first turning-off signal is provided to the first switch when the RF switching module is in the first mode, and the first turning-on signal is provided to the second switch after the first turning-off signal is provided for a first predetermined time to make the RF switching module be switched from the first mode to the second mode.

6. The RF switching module of claim 5, further comprising:

a third switch coupled between the second port and ground; and a fourth switch coupled between the first port and the ground;

wherein the third switch is turned on and the fourth switch is turned off in the first mode, and the third switch is turned off and the fourth switch is turned on in the second mode;

wherein the first turning-off signal is also provided to the third switch when the RF switching module is in the first mode, and the first turning-on signal is also provided to the fourth switch after the first turning-off signal is provided for the first predetermined time to make the RF switching module be switched from the first mode to the second mode.

7. The RF switching module of claim 6, wherein a second turning-off signal is provided to the second switch and the fourth switch by the control signal generation module when the RF switching module is in the second mode, and a second turning-on signal is provided to the first switch and the third switch by the control signal generation module after the second turning-off signal is provided for a second predetermined time to make the RF switching module be switched from the second mode to the first mode.

8. The RF switching module of claim 7, wherein the first predetermined time is greater than the second predetermined time, the first mode is a transmitting mode, and the second mode is a receiving mode.

9. The RF switching module of claim 5, wherein the first predetermined time is equal to or greater than a product of a resistance of a gate resistor of the first switch and a capacitance of an equivalent gate capacitor of the first switch.

10. The RF switching module of claim 5, wherein the first predetermined time is equal to or greater than a time for making a gate voltage of the first switch lower than a threshold voltage of the first switch.

11. The RF switching module of claim 5, wherein the first predetermined time is equal to or greater than a time for making a gate voltage of the first switch lower than half a sum of a highest gate voltage of the first switch and a lowest gate voltage of the first switch.

12. The RF switching module of claim 6, wherein the control signal generation module is further used for generating a first control signal and a second control signal, wherein the control signal generation module comprises:

a first delay unit for generating and outputting a first delay signal according to an input signal and the first predetermined time;

a first AND gate coupled to the first delay unit and the first switch and the third switch for generating and outputting the first control signal to the first switch and the third switch according to the input signal and the first delay signal;

a second delay unit for generating and outputting a second delay signal according to the input signal and the second predetermined time;

a first inverter for generating an inverse signal according to the input signal;

a second inverter coupled to the second delay unit for generating an inverse delay signal according to the second delay signal; and a second AND gate coupled to the first inverter, the second inverter, the second switch, and the fourth switch for generating and outputting the second control signal to the second switch and the fourth switch according to the inverse signal and the inverse delay signal;

wherein the first control signal comprises the first turning-off signal and the second turning-on signal, and the second control signal comprises the first turning-on signal and the second turning-off signal.

13. The RF switching module of claim 6, wherein the first switch, the third switch, the second switch, and the fourth switch are metal-oxide-semiconductor field effect transistors; the first turning-off signal and the second turning-on signal control turning-on or turning off of the first switch and the third switch through adjusting biases of a gate of the first switch and a gate of the third switch, or through adjusting a voltage drop between a source/drain and the gate of the first switch and a voltage drop between a source/drain and the gate of the third switch; and the first turning-on signal and the second turning-off signal control turning-on or turning off of the second switch and the fourth switch through adjusting biases of a gate of the second switch and a gate of the fourth switch, or through adjusting a voltage drop between a source/drain and the gate of the second switch and a voltage drop between a source/drain and the gate of the fourth switch.

14. The RF switching module of claim 5, wherein the first switch, the second switch, the third switch, and the fourth switch are silicon on insulator (SOI) transistors or high-electron-mobility transistors.

15. The RF switching module of claim 5, wherein a second turning-off signal is provided to the second switch by the control signal generation module when the RF switching module is in the second mode, and a second turning-on signal is provided to the first switch by the control signal generation module after the second turning-off signal is provided for a second predetermined time to make the RF switching module be switched from the second mode to the first mode.

16. The RF switching module of claim 5, wherein the control signal generation module is further used for generating a first control signal and a second control signal, wherein the control signal generation module comprises:

a first delay unit for generating and outputting a first delay signal according to an input signal and the first predetermined time;

a first AND gate coupled to the first delay unit and the first switch for generating and outputting the first control signal to the first switch according to the input signal and the first delay signal;

a second delay unit for generating and outputting a second delay signal according to the input signal and the second predetermined time;

a first inverter for generating an inverse signal according to the input signal;

a second inverter coupled to the second delay unit for generating an inverse delay signal according to the second delay signal; and a second AND gate coupled to the first inverter, the second inverter, and the second switch for generating and outputting the second control signal to the second switch according to the inverse signal and the inverse delay signal;

wherein the first control signal comprises the first turning-off signal and the second turning-on signal, and the second control signal comprises the first turning-on signal and the second turning-off signal.

17. The RF switching module of claim 5, wherein the first switch and the second switch are metal-oxide-semiconductor field effect transistors; the first turning-off signal and the second turning-on signal control turning-on or turning off of the first switch through adjusting biases of a gate of the first switch, or through adjusting a voltage drop between a source/drain and the gate of the first switch; and the first turning-on signal and the second turning-off signal control turning-on or turning off of the second switch through adjusting biases of a gate of the second switch, or through adjusting a voltage drop between a source/drain and the gate of the second switch.

18. The RF switching module of claim 5, wherein the first switch, the second switch are silicon on insulator (SOI) transistors or high-electron-mobility transistors.

* * * * *